Jan. 5, 1954     D. E. BLACKFORD     2,665,107
VALVE FOR CONTROLLING FLOW OF GAS TO BURNERS
Filed April 18, 1951     2 Sheets-Sheet 1
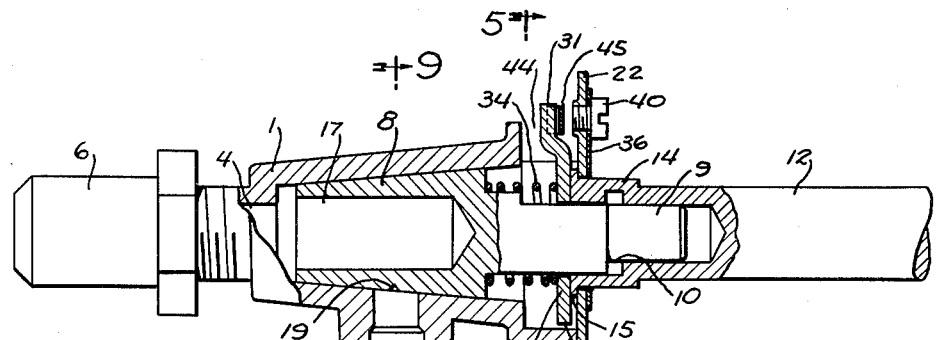
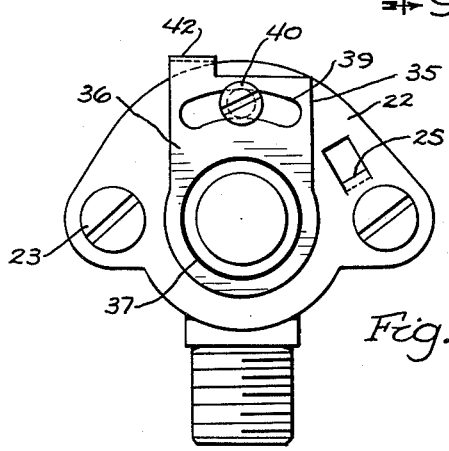
INVENTOR.
Donald E. Blackford
BY Barnes, Kisselle, Laughlin & Raisch
ATTORNEYS.

INVENTOR.
Donald E. Blackford
BY
Barnes, Kisselle, Laughlin & Raisch
ATTORNEYS.

Patented Jan. 5, 1954

2,665,107

UNITED STATES PATENT OFFICE 2,665,107

VALVE FOR CONTROLLING FLOW OF GAS TO BURNERS

Donald E. Blackford, Plymouth, Mich., assignor to Lincoln Brass Works, Inc., Detroit, Mich., a corporation of Michigan Application April 18, 1951, Serial No. 221,656

4 Claims. (Cl. 251—164)

This invention relates to a valve for controlling the flow of fuel gas such, for example, as to a burner for a gas range.

One object of the invention is to provide an improved and simplified construction for indicating the position of the valve ports. The invention may be embodied in what is generally termed a low-high valve, wherein the rotary valve member operates between fixed stops and there is an intermediate position indicated by an audible snap, or click. Another object of the invention is to provide a valve of this type of locking characteristics in that the valve is locked in its off position. In accordance with the invention a minimum number of parts are provided and the novel construction provides for using parts of fairly large size so that small intricate mechanism is avoided. A valve constructed in accordance with the invention is shown in the accompanying drawings:

Fig. 1 is a view of a valve constructed in accordance with the invention, shown partly in section, and illustrating the valve in its low or simmer position.

Fig. 2 is an end elevation of the valve showing a spring member.

Fig. 3 is an elevational view of the spring member.

Fig. 4 is a view illustrating the formation of the yieldable element of the spring member.

Fig. 5 is a sectional view taken substantially on line 5—5 of Fig. 1 showing the position of some parts when the valve is locked in off position.

Figure 6:
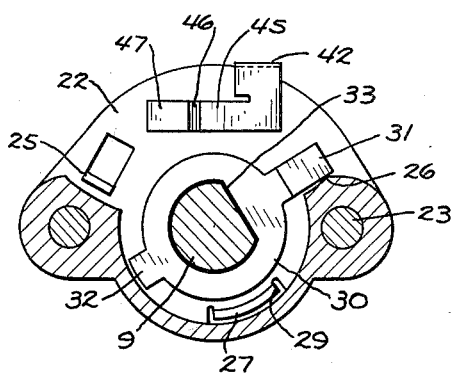
Fig. 6 is a view similar to Fig. 5 showing the position of some parts when the valve is in full on position.

The valve has a body member 1 with a tapered chamber 2 therein. It has an inlet passage 3 disposed in a screw threaded projection and an outlet 4 in another threaded projection provided with the usual hood 6.

Figure 9:
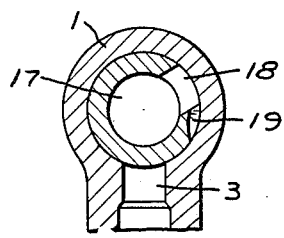
Fig. 9 is a view taken substantially on line 9—9 of Fig. 1 showing the position of the valve ports in off position.
Figure 10:
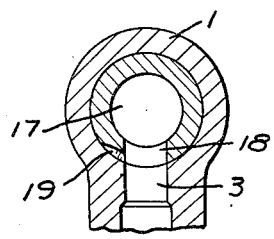
Fig. 10 is a view similar to Fig. 9 showing the position of the ports in full on position.
Figure 11:
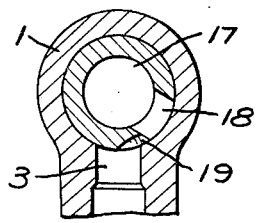
Fig. 11 is a view similar to Figs. 9 and 10 showing the position of the ports in simmer position.

Positioned in chamber 2 is a tapered valve member 8 with a projecting stem portion 9. The stem portion is flat on one side, as shown at 10, and an operating stem 12 slidably fits over the stem 9 and is rotatably connected thereto by engaging the flat face 10. The operating stem 12 has an enlarged portion 14 and a flange on its inner end, as shown at 15, the purpose of which will presently appear. The valve member 8 has a passageway 17 therein which opens through its smaller end and thus communicates with the outlet passage 4, and it has a port 18, as shown in Figs. 9, 10 and 11. The port 18 has, what is called, a tail port 19, which is in the form of a milled slot which is of maximum depth where it communicates with the port 18 but gradually decreases in depth as the bottom thereof approaches the outside surface of the member 8.

Figure 8:
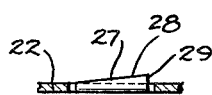
Fig. 8 is a view taken substantially on line 8—8 of Fig. 5 showing the lock construction.

There is a cap 22 attached to the body by screws 23 and which has a central opening through which the portion 14 of the operating stem extends, and the flange 15 lies inside the opening and engages the face of the cap. This cap has a struck up element 25 which becomes a stop shoulder. Another stop shoulder 26 is provided by a portion of the body. The cap also has a struck up element 27. This element has an inclined face 28 and an abrupt shoulder 29 (Fig. 8).

Figure 7:
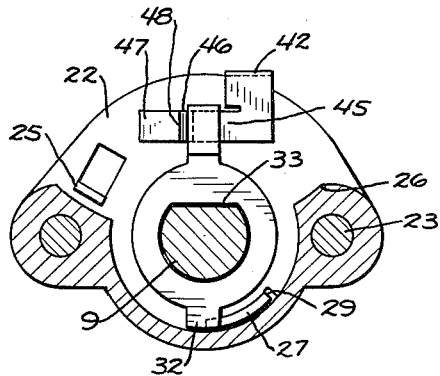
Fig. 7 is a view similar to Figs. 5 and 6 showing the position of some parts when the valve is in simmer position.

The stem portion 9 has another flat face 33 so that it is D-shape in cross section as shown in Figs. 5, 6 and 7, and mounted thereon is a washer 30. Thus the washer turns with the stem 9 but it is just slightly loose thereon. The washer has a projection or finger 31 and a projection or finger 32. Conveniently these fingers are oppositely disposed. A coil spring 34 surrounds the stem 9. It holds the washer 30 against the portion 14 and flange 15 of the operating stem 9, and reacts against the valve member 8 to hold it on its seat.

A spring member generally indicated at 35 has a body portion 36 which is apertured as at 37 to fit over the portion 14, and so that the body portion 36 lies against the outside face of the cap 22. The body portion has an arcuate slot 39 and a screw 40 passes through this slot and is threaded into the cap, as shown in Fig. 1. The spring member is fashioned to provide a bight portion 42 which extends over the edge of the cap (Fig. 2), and a leg portion 43 which extends inwardly toward the axis of the valve member and partially into the body which is cut away as at 44 to provide clearance therefor. The leg portion 43 carries a spring element 45 which projects laterally therefrom and is fashioned to provide a relatively abrupt shoulder 46 and an inclined portion 47, which are on opposite sides of the high point 48.

When the valve is in off position, the port 18 is disaligned from the inlet 3, as shown in Fig. 9, and in this position the projection 31 substantially abuts the limit stop 25. The projection 32 is engaged behind the shoulder 29. Thus, the valve member 8 is locked in position and cannot be turned in either direction as Fig. 5 is viewed. At this point, it might be stated that the limit stop 25 and the lock member 27 are both formed on the cap. In this manner the elements 25 and 27 are accurately located relative to each other and remain accurately located relative to each other even though there may be some variation, due to tolerances or the like, of the cap relative to the valve body.

In order to operate the valve from its locked position, the operating stem, which is to be equipped with a suitable operating handle (not shown), is pushed inwardly. This urges the washer 30 inwardly and disengages the locking projection 32 from the shoulder 29. Then the valve member may be turned clockwise as Fig. 5 is viewed and the inward pressure relieved. If it is turned to the limit of its movement, which is determined when the projection 31 strikes the limit stop 26, the port 18 is substantially in full registry with the inlet 3, and gas flows through the passage 17 and outlet passage 4 to the burner.

However, there is an intermediate low or simmer position. It will be noted that the yieldable element 45 lies in the path of the projection 31. In this clockwise movement, the projection 31 engages the inclined face 47 and depresses the spring element 45. When the projection rides over the crest 48 the spring element snaps back to position. In other words, the projection 31 snaps over the crest 48 and there is an audible indication. This snapping action is accomplished due to the fact that the washer 30 is slightly rotatably loose on the stem 9, and when it rides over the crest 48, it snaps rotatably relative to the valve member 8. In moving over the yieldable element the washer itself may be yieldably displaced by compression of the coil spring 34. In this simmer or low position the tail port 19 is in registry or partial registry with the inlet 3. This precise position may be adjusted and regulated by loosening the screw 43 and rotatably adjusting the spring member 36 about the axis of the stem portion 14. When a proper position is attained the screw is tightened.

When the valve member is moved counterclockwise, from the full on position, as shown in Figs. 6 and 10, the projection 31 strikes the relatively abrupt shoulder 46. This again, indicates by resistance, the simmer or low position. However, the valve 8 may be moved further counter-clockwise to off position by the application of a slight additional torque to cause the projection 31 to ride over the shoulder 46 and flex the spring element 45 in so doing. As the valve continues counter-clockwise movement and approaches the off position, as shown in Fig. 5, the projection 32 engages and rides up the inclined face 28. This is permissible because the washer can shift to the left as Fig. 1 is viewed thus compressing spring 34. As above explained, the limit stop 25 and the element 27 are accurately positioned, being both formed on the cap, and substantially at the time the projection 31 engages the limit stop 25 projection 32 snaps behind the shoulder 29 and the valve is locked in off position.

I claim:

1. In a valve for controlling the flow of fuel gas to a burner, said valve having a body, a valve member rotatably seated in the body, the body and valve member having passages arranged to be brought into and out of registry by rotary movement of the valve member; a projection movable with the valve member, limit stops fixed relative to the body and engageable by the projection, a cap for the body, the valve member having an operating stem portion projecting through the cap, a member having a body portion disposed against the outside of the cap and having an aperture through which the stem portion extends so that the member is journaled on the stem portion, the body portion having an elongated slot therein, a screw extending through the slot and threaded into the cap, whereby said member is adjustable within the limits of the elongated slot, said member having a bight portion extending over the edge of the cap, an arm extending inwardly on the inside of the cap, and a yieldable portion carried by said arm and having a surface positioned between the valve body and the cap to be engaged by said projection to indicate a relative position of the passages in the body and valve member, said portion yielding for movement of the projection past said surface upon turning of the valve member.

2. In a valve for controlling the flow of fuel gas to a burner, said valve having a body, a valve member rotatably seated in the body, the body and valve member having passages arranged to be brought into and out of registry by rotary movement of the valve member; a projection movable with the valve member, a cap for the body, the valve member having an operating stem portion projecting through the cap, a member having a body portion disposed outside the cap and adjustably secured to the cap, said member having a bight portion extending over the edge of the cap and an arm extending inwardly on the inside of the cap and between the valve body and cap, and a yieldable portion carried by said arm in a position to be engaged by said projection in the turning of the valve member to indicate a relative position of the passages in the body and valve member, said portion yielding for movement of the projection past the same upon turning of the valve member.

3. In a valve for controlling the flow of fuel gas to a burner, said valve having a body, a valve member rotatably seated in the body, the body and valve member having passages arranged to be brought into and out of registry by rotary movement of the valve member; a projection movable with the valve member, a cap for the body, the valve member having an operating stem portion projecting through the cap, a member having a body portion disposed outside the cap and journaled on the operating stem portion and adjustably secured to the cap, said member having a bight portion extending over the edge of the cap and an arm extending inwardly on the inside of the cap and between the valve body and cap, an engaging portion carried by said arm in a position to be engaged by said projection to indicate a relative position of the passages in the body and valve member, and spring means acting upon the projection so that the same may yield for movement of the projection past said engaging element upon turning of the valve member.

4. In a valve for controlling the flow of fuel gas to a burner, said valve having a body, a valve member rotatably seated in the body, the body and valve member having passages arranged to be brought into and out of registry by rotary movement of the valve member; means having a projecting portion movable with the valve member, a cap for the body, the valve member having an operating stem portion projecting through the cap, a member having a body portion disposed outside the cap and adjustably secured to the cap and journaled on the stem portion, said member having a bight portion extending over the edge of the cap and an arm extending inwardly on the inside of the cap and between the valve body and cap, an engaging portion carried by said arm in a position to be engaged by said projecting portion of said means to indicate a relative position of the passages in the body and valve member, at least one of the said portions being yieldable, whereby the projecting portion may be moved past said engaging portion upon turning of the valve member.

DONALD E. BLACKFORD.

References Cited in the file of this patent

UNITED STATES PATENTS

| Number | Name | Date |
|---|---|---|
| 2,217,963 | Mueller | Oct. 15, 1940 |
| 2,262,703 | Stuckenbolt | Nov. 11, 1941 |
| 2,299,666 | Turner et al. | Oct. 20, 1942 |
| 2,334,346 | Mueller | Nov. 16, 1943 |
| 2,572,507 | Mueller | Oct. 23, 1951 |